(12) United States Patent
Kropp

(10) Patent No.: US 10,815,056 B2
(45) Date of Patent: Oct. 27, 2020

(54) METHOD AND DEVICE FOR AUTOMATICALLY RECEIVING, STORING AND DISPENSING OF ARTICLES AND/OR ARTICLE COMMISSIONS RECEIVED IN A PACKAGING, AND PACKAGING

(71) Applicant: Daniel Kropp, Schöneck (DE)

(72) Inventor: Daniel Kropp, Schöneck (DE)

(*) Notice: Subject to any disclaimer, the term of this patent is extended or adjusted under 35 U.S.C. 154(b) by 0 days.

(21) Appl. No.: 16/094,680

(22) PCT Filed: Apr. 24, 2017

(86) PCT No.: PCT/EP2017/059684
§ 371 (c)(1),
(2) Date: Mar. 18, 2019

(87) PCT Pub. No.: WO2017/182674
PCT Pub. Date: Oct. 26, 2017

(65) Prior Publication Data
US 2019/0210799 A1    Jul. 11, 2019

(30) Foreign Application Priority Data

Apr. 22, 2016   (DE) .................. 10 2016 004 914
Dec. 12, 2016   (DE) .................. 10 2016 014 676

(51) Int. Cl.
*B65G 1/04*      (2006.01)
*G06Q 50/28*     (2012.01)
(Continued)

(52) U.S. Cl.
CPC ......... *B65G 1/0435* (2013.01); *B65G 1/0421* (2013.01); *B65G 1/137* (2013.01);
(Continued)

(58) Field of Classification Search
CPC .................. B65G 1/0435; B65G 15/58
See application file for complete search history.

(56) References Cited

U.S. PATENT DOCUMENTS 3,782,565 A * 1/1974 Doran ................ B65G 1/0435
                                                 414/274
5,129,777 A * 7/1992 Pohjonen ............ B65G 1/0435
                                                 414/225.01
(Continued)

FOREIGN PATENT DOCUMENTS

CN      205150486 U     4/2016
DE         412087 A1    1/1992
(Continued)

OTHER PUBLICATIONS

International Search Report, dated Mar. 13, 2018, corresponding to Application No. PCT/EP2017/059684.

*Primary Examiner* — Kaitlin S Joerger
(74) *Attorney, Agent, or Firm* — Ladas & Parry, LLP; Malcolm J. MacDonald

(57) ABSTRACT

A method and a device for handling, in particular automatically receiving, storing and dispensing of articles and/or article commissions received in a packaging. In order to be able to handle the articles and article commissions in a simple, rapid and safe manner and to achieve a high utilization of storage area with little technical complexity, it is proposed that the articles and/or article commissions are packaged in an at least in some sections magnetically or ferromagnetically formed packaging and that the at least in some sections magnetically or ferromagnetically formed packaging is fixed and/or moved by means of an electromagnetic gripping, sliding and/or traction means.

17 Claims, 10 Drawing Sheets

Figure 1:
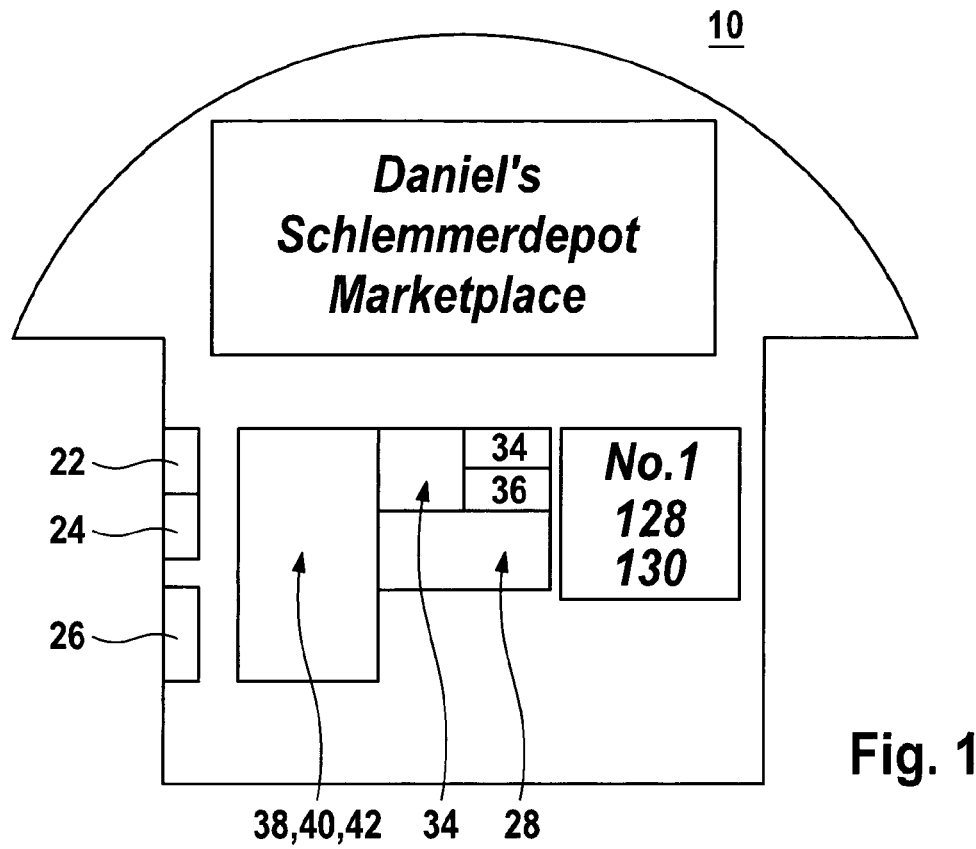

(51) Int. Cl.
  *G06Q 10/08* (2012.01)
  *B65G 1/137* (2006.01)
  *B65G 15/58* (2006.01)
  *G07F 11/62* (2006.01)

(52) U.S. Cl.
  CPC ............ *B65G 15/58* (2013.01); *G06Q 10/08* (2013.01); *G06Q 10/087* (2013.01); *G06Q 50/28* (2013.01); *G07F 11/62* (2013.01)

(56) References Cited

U.S. PATENT DOCUMENTS

| | | | | |
|---|---|---|---|---|
| 5,328,316 | A * | 7/1994 | Hoffmann | B65G 1/0435 |
| | | | | 187/404 |
| 5,380,139 | A * | 1/1995 | Pohjonen | B65G 1/0435 |
| | | | | 414/273 |
| 6,056,134 | A * | 5/2000 | Katzenschwanz | B65G 1/0421 |
| | | | | 211/1.57 |
| 9,242,810 | B2 * | 1/2016 | Lossov | B65G 63/065 |
| 10,280,001 | B2 * | 5/2019 | Oki | B65G 1/0407 |
| 2006/0275625 | A1 | 12/2006 | Lieberman | |
| 2017/0024838 | A1 | 1/2017 | Kropp | |
| 2018/0215540 | A1 * | 8/2018 | Tanaka | B65G 61/00 |

FOREIGN PATENT DOCUMENTS

| | | | | |
|---|---|---|---|---|
| DE | 4120287 | A1 * | 1/1992 | ......... B65G 1/0407 |
| DE | 102008054711 | A1 | 6/2009 | |
| JP | H01156298 | A | 6/1989 | |
| JP | H08119411 | A | 5/1996 | |
| JP | H10250803 | A | 9/1998 | |
| JP | 2014041410 | A | 3/2014 | |

\* cited by examiner

METHOD AND DEVICE FOR AUTOMATICALLY RECEIVING, STORING AND DISPENSING OF ARTICLES AND/OR ARTICLE COMMISSIONS RECEIVED IN A PACKAGING, AND PACKAGING

The invention relates to a method for handling, in particular automatic reception, storage and dispensing of items and/or item consignments received in a packaging according to the generic part of Claim 1.

Furthermore, the invention relates to a device according to the generic part of claim 4 to carrying out the method that makes possible the automated reception, storage and dispensing of items and/or item consignments in different sizes and formats taking into account the greatest possible efficiency regarding the workload and the storage capacities, the integration rate and the rate of removal from the warehouse, the flexibility between the entry and the discharge of the items and/or item consignments relative to the expense.

Finally, the invention relates to a packaging for handling, in particular for the automatically receiving, storing and dispensing of items and/or item consignments according to the generic part of claim 15.

Previous technologies are characterized in that a handling system "grasps" or "lifts" items and or item consignments upon storing in different ways and then transports them to the predetermined storage location and "deposits" them there again. During the removal from the warehouse the handling system then travels back to the location where the items and/or item consignments are located, "grasps" them again or attracts them by suction, "raises" them and transports them back to the location at which the further discharge takes place and "places" or "sets" them down there again.

At the present time different grasping techniques are used for this such as, e.g., pneumatically or mechanically driven pincers or tools that operate by vacuum techniques such as, e.g., suction plates.

For items such as drugs, these techniques are suitable because the packaging, even if it is made only of apparently unstable materials such as cardboard, yet in relation to the total weight is very stable and thus safe to handle.

Another aspect which makes such a handling possible is that, as in the example of the drug packaging, the weight of the contents of this packaging is often very evenly distributed.

However, if packages of paperboard or composites such as e.g. Tetrapak (Registered Trade Mark), having items as contents which are heavier in relation to the packaging, or can not be loaded evenly, a vacuum suction means is not suitable for safe and quick handling.

Normally, item consignments composed by hand are not uniformly put together in one package. This has the consequence that by automatically handling of these packages higher rolling forces arise, as in evenly linear loaded packages, such as drug packages.

In addition, the package of cardboard or similar material of packages with a weight of about 1-7 Kg is in relation much less stable than, for example, a drug package, which has a weight of only a few grams.

These may, as they are a) be uniformly loaded and/or b) have a relatively strong weight-to-weight packaging, with the handling equipment currently available on the market, e.g. Vacuum suckers are sucked and transported to the storage area.

Such an efficient handling solution can not be used on heavier packages without severely reducing the speed of the handling process or accepting damage to the package, or the loss of the commission and thus handling failures.

When using gripping tools also a certain contact pressure must be adjusted. This can occur when gripping e.g., foil-packaged perishable foods, lead to loss of quality due to bruises. In addition, the adjustment of the contact pressure due to different sizes and weights is not reliable possible.

Based on this, the object of the present invention is to develop a method and a device as well as a packaging of the type mentioned at the outset in such a way that the items to be handled or the item consignments can be handled quickly and safely with simple packaging. In addition, a high storage space use to be achieved with little technical effort.

The object is achieved in that the items and/or item consignments are packaged in a packaging designed magnetic or ferromagnetic at least in some sections, and the packaging designed magnetic or ferromagnetic at least in some sections is fixed and/or moved by means of an electromagnetic grasping, pushing and/or pulling means.

Preferably, the packaging designed magnetic or ferromagnetic at least in some sections is pulled and/or pushed by the electromagnetic grasping, pushing and/or pulling means onto a transport surface such as an electromagnetic one magnetizable at least in some areas, and the packaging designed magnetic or ferromagnetic at least in some sections is fixed and transported on the magnetizable section of the transport surface.

Preferably, the packaging designed magnetic or ferromagnetic at least in some sections is fixed by activating an electromagnetic device of the electromagnetic grasping, pushing and/or pulling means, the packaging is pulled or pushed by the electromagnetic grasping, pushing and/or pulling means onto that section of the transport surface magnetizable by means of an electromagnetic device, and the packaging is fixed on the transport surface by activating the magnetizable section.

One of the main advantages of the method is the fact that the items to be moved or item consignments not in hard cases but in comparatively resource-saving packaging, disposable or reusable packaging, which need not have a solid or smooth surface, can be handled quickly and safely. In this case, a significantly higher storage utilization is achieved with less technical effort compared to the prior art, because in contrast to the prior art, no gripper tools must be used, which require a lateral or vertical distance to adjacent packaging or shelves. Due to the magnetic adhesion, the packaging can be pulled out of the storage area or pushed into it. Also, the packaging is magnetically fixed during transport.

As a result, packages that are significantly less stable relative to the total weight of the contents can be used. The package need not be strong or hard. Furthermore, a complex and prone vacuum technique can be omitted. Packaging with flat surfaces, which are covered with moisture or frost, can be moved smoothly by the magnetic fixing.

Furthermore, the invention relates to a device such as warehouse for handling of items received in a packaging, comprising means for receiving items from at least one first actor such as a supplier means for storing items, and means for automated dispensing of items to at least one second actor such as a taker or customer, where the means for storage of items comprises a handling system with a warehouse robot and a storage system in the form of a shelf system and where the warehouse robot has a receiving/discharging unit with a transport surface, from which and onto which the items are pushed/pulled by means of a grasping, pushing or pulling means, In such a device it is provided that an electromagnetic device such as an electromagnet is placed in or behind the grasping, pushing or pulling means, with which electromagnet the packaging designed magnetic or ferromagnetic of the items and/or item consignments is fixed on the grasping, pushing or pulling means.

Preferably, an electromagnetic device such as an electromagnet is placed in or under the transport surface to fix the packaging during transport.

Especially preferred, in or on the grasping, pushing or pulling means a camera device is placed with which the placing of the packaging with the items and/or item consignments on the grasping, pushing or pulling means is monitored.

Further, the invention relates to a packaging for handling, in particular automatic reception, storage and dispensing of items and/or item consignments.

The packaging is characterized in that it is made from a composite material with an inlay and/or a composite of at least one magnetic or ferromagnetic material.

The packaging is preferably made from one or more non-magnetic materials or substances which are provided on the inside or outside with a magnetic or ferromagnetic material and/or are fixed, such as glued, using such a material in a specific version.

Also, the magnetic or ferromagnetic material may be designed fully or partially as a magnetic or ferromagnetic disposable or reusable chip or as a magnetic or ferromagnetic means of payment such as a coin.

Preferably, the packaging is made from a composite material of two or more materials of which at least one material is magnetic or ferromagnetic.

Alternatively, the packaging is made from a non-magnetic substance and is fully or partially magnetic by affixing magnetic or ferromagnetic material such as metal to the inside or outside.

The magnetic or ferromagnetic material is preferably laminated in the form of a metal foil in the composite material and/or fixed to the non-magnetic raw material such as cardboard inside or outside as glued.

The packaging according to the invention comprises a composite of two or more materials, of which at least one material is magnetic or ferromagnetic, or is made of a non-magnetic material and wholly or partially magnetic by in- and/or outside attaching magnetic or ferromagnetic material such as metal. In a particular embodiment, this is particularly resource-saving.

The packaging is thus fixable and/or movable by the electromagnetic grasping, pushing or pulling means and an electromagnetic transport surface.

In currently often used handling systems, packaging is mainly gripped or picked by vacuum cups and thus moved or transported from one place to another.

If a packaging made of a composite material with a magnetic or ferromagnetic material, or made of a non-magnetic raw material such as cardboard and equipped with a magnetic or ferromagnetic material inside or outside and glued or bonded in a particular embodiment with such a magnetic or ferromagnetic material fixes a different type, this packaging can be fixed and/or moved by an electromagnetic grasping, pushing or pulling device, as well as an electromagnetic transport surface.

This has the advantage that, on the one hand, higher weights as well as unevenly distributed weights can be contained in this wholly or partly magnetic packaging and this packaging can be fixed and/or moved by means of an electromagnetic grasping means, pushing or pulling device and an electromagnetic transport surface and from this for such packaging and its content by an electromagnetic fixing, on a pulling or pushing means and/or grasping means and or on an electromagnetic transport surface can realize a much safer and faster handling.

This can be done, inter alia, by activating the electromagnetic device, which is located in or on a pulling and/or pushing and/or grasping means, the packaging fixed, pulls or pushes on a transport surface, which in this case is equipped also with an electromagnetic device on or in this transport surface, replace this from the pulling and/or pushing and/or grasping means by deactivating the electromagnetic device, then activating the electromagnetic device located in or on the transport surface, thus the package is fixed on or under the surface and thus can be transported quickly and safely to another location.

Once there, the packaging can be deposited by deactivating the electromagnetic device in or on the transport surface and/or be fixed again by a pulling and/or pushing and/or grasping means equipped with an electromagnetic device and moved to, for example, a storage location.

Such an electromagnetic handling system can thus acting safely and quickly not only magnetic elements, but also packaging which consists of a composite material with a magnetic material and/or packages made of a non-magnetic material, e.g. cardboard or other are made, but inside or outside equipped with a magnetic material and/or glued in a particular embodiment with such a magnetic material or fixed by another type.

With currently packaging, such as e.g. Tetrapak, made of composites it is not possible because the materials used, e.g. plastics, cardboard, paper or aluminum are not magnetic.

This magnetic packaging is particularly resource-conserving in the case when the magnetic material which is inserted into the composite or when the packaging is made of a non-magnetic raw material, such as cardboard and equipped with a magnetic material inside or outside and in a special embodiment with a bonded or otherwise fixed by such magnetic material, this magnetic material is wholly or partly formed as a magnetic one-way or reusable chip or as a magnetic currency such as coin. The magnetic chips or means of payment may be arranged in receptacles such as inside or outside pockets.

If a magnetic material of whatever form is used as described, both production and recycling costs, which ultimately have to be refinanced by a customer, are incurred. In addition, resources such as e.g. metal consumed.

Coins such as the 5 cents Euro coin or others has/have by their material composition over outstanding magnetic properties, and/or can very well be attracted by a magnet like electromagnet.

If such coins or other coins are used to make such a package as described fixable and/or moveable by an electromagnetic grasping means, pushing or pulling device and/or an electromagnetic transport surface, these coins are used because of their property and not consumed, since these can be separated and used as a means of payment before recycling the remaining packaging.

In summary, the invention relates to a method and apparatus for the automatic reception, storage and dispensing of items and/or item consignments of various sizes and formats by means of a magnetic pushing or pulling means, as well as a magnetizable transport surface.

By the described method, with the aid of a magnetizable transport surface and a magnetizable pushing or pulling means, which is equipped with electromagnets, the items are moved not free, but as on a tray from one location to another location and hence they can be fixed additionally by the electromagnet a much faster and safer handling is possible.

The invention described in the patent application is applicable both on food and nonfood consignments/packages which are to be traded fully and/or semi-automatically.

The magnetic or ferromagnetic material can also be fixed directly to the items.

An optimal workload of the storage space is achieved by the measures of the invention. In the previous prior art and in the case of different item formats this was only possible with expensive grasping techniques or by very high technical expense which arose due to the fact that during the depositing of the items mechanically operated drawer systems are used onto which the items are then deposited.

Furthermore, a rapid reception, storage and subsequent removal from storage are achieved since the item is fixed during the transport by the pushing means and/or the pulling means and/or the transport surface.

As a result, very rapid movements, in particular accelerations of the receiving unit/discharging unit are made possible. As a consequence, synergistic effects can be utilized which are produced in that in the case in which several items and/or item consignments which are located at different storage sites or are to be brought to these sites can be transported to them without a number of grasping or fixing tools corresponding to the items and/or item consignments being required.

Since the handling system of the present invention is separated by a lock from the person presenting the items, the advantage is achieved that the items do not have to be manually fixed correctly into a grasping system. As a result, it is not necessary that the handling system must precisely adjust to a position by an expensive technique, so that additional alignment units can be eliminated.

Other details, advantages and features of the invention result not only from the claims, the features to be gathered from them—alone and/or in combination—but also from the following description of a preferred exemplary embodiment shown in the drawings.

Figure 2:
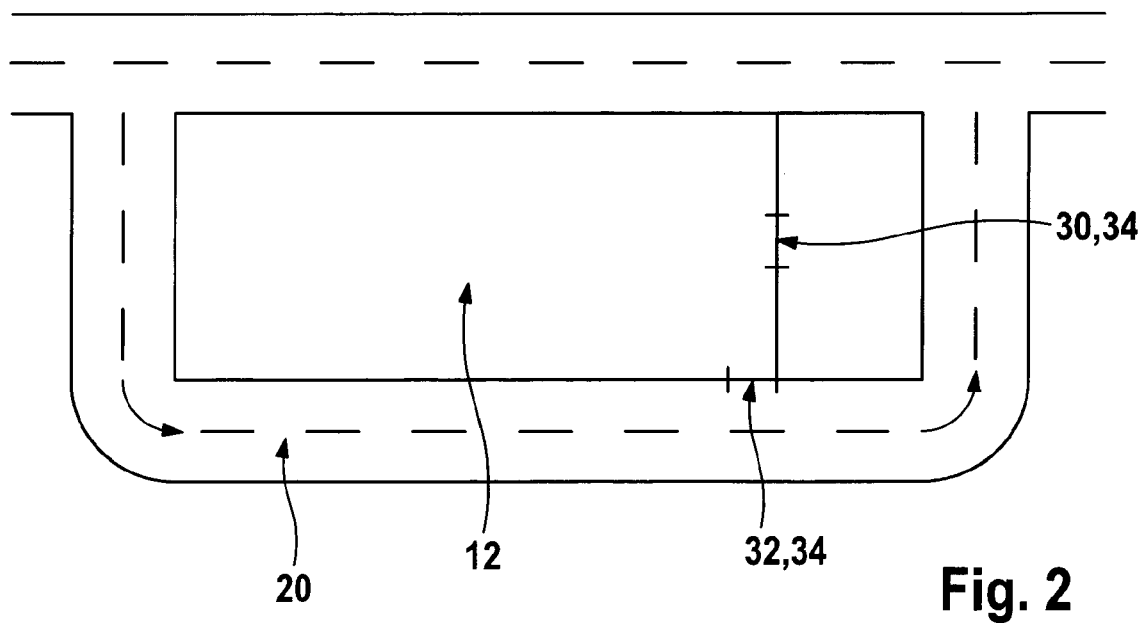
Figure 3A:
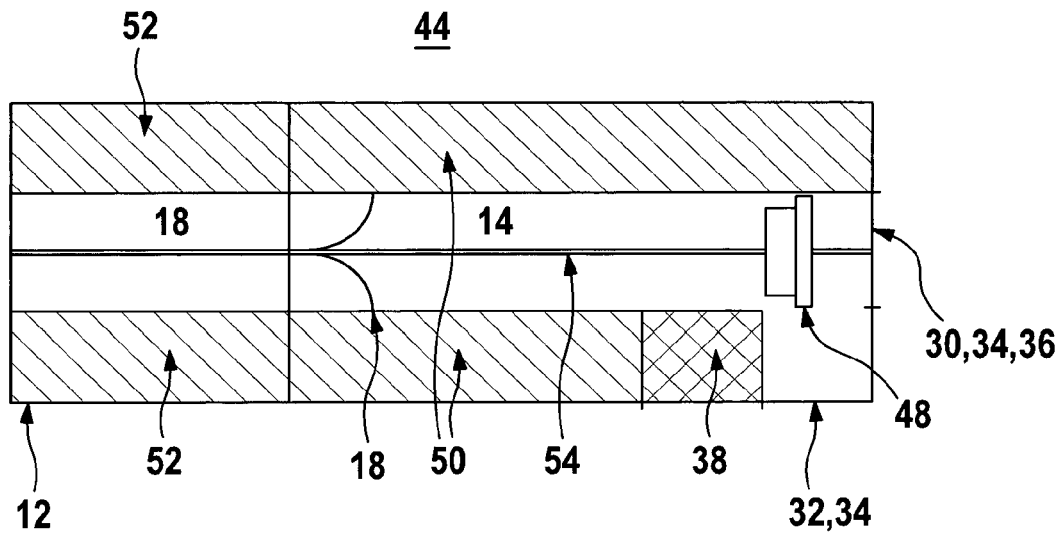
Figure 4:
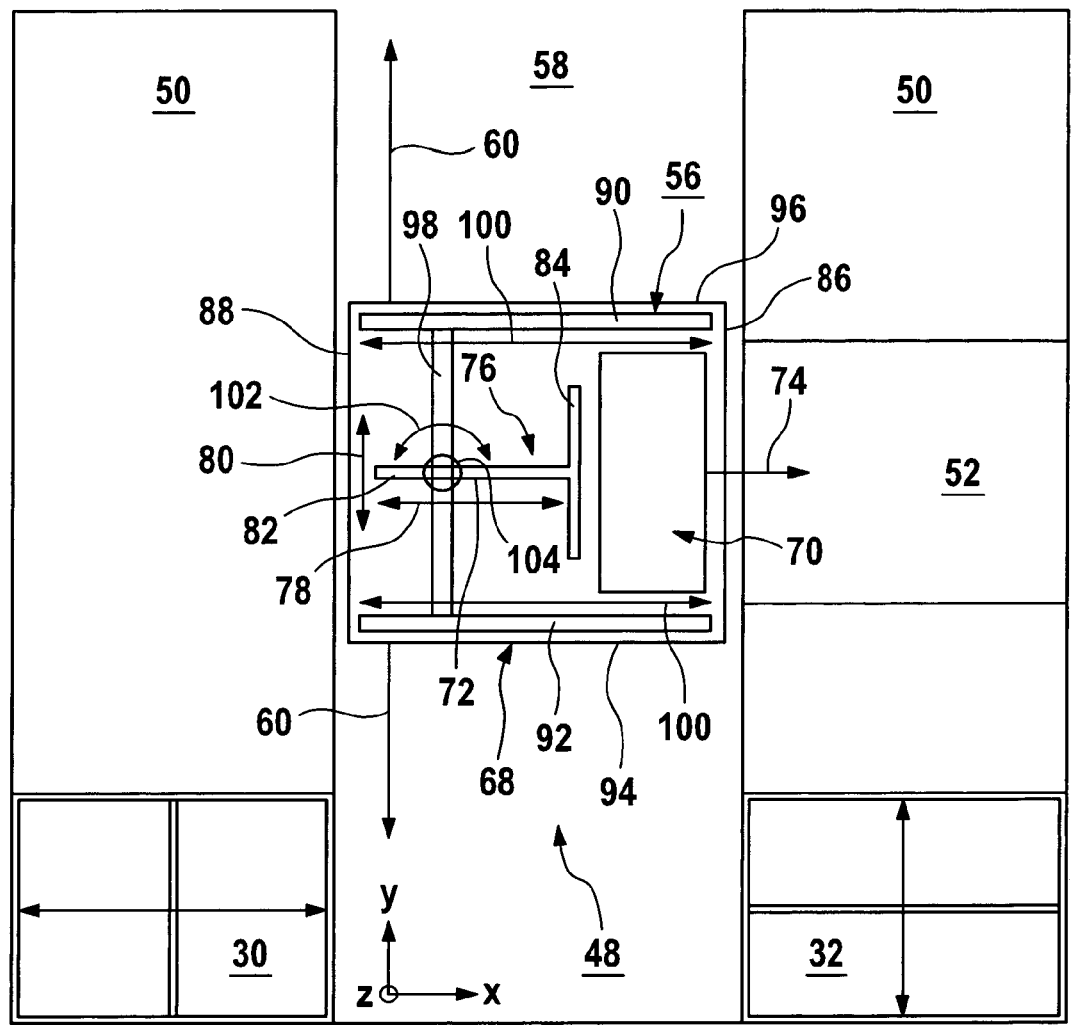
Figure 5:
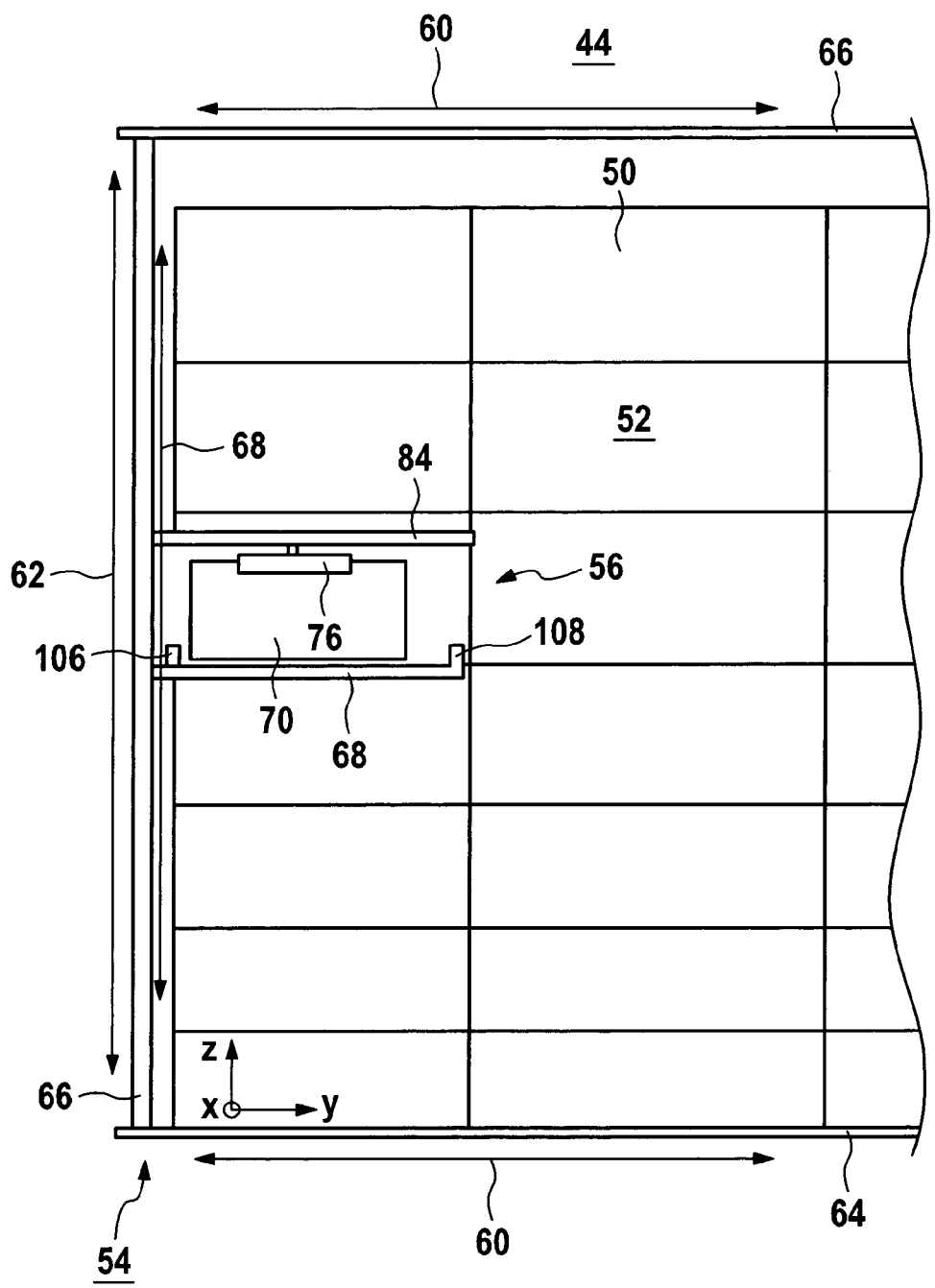
Figure 6A:
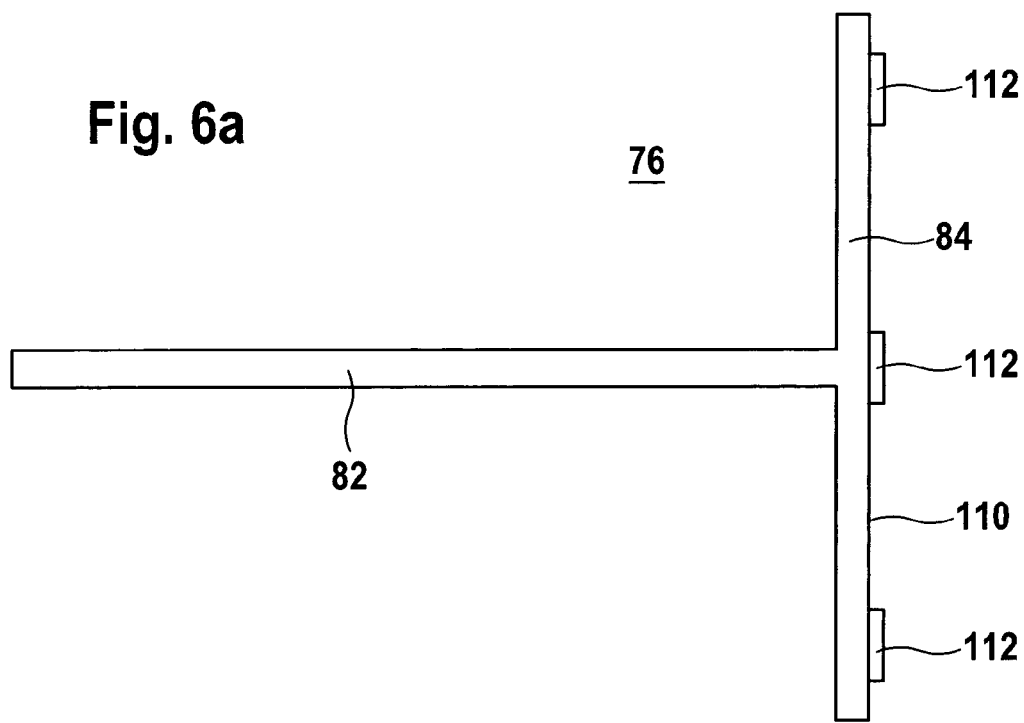
Figure 7:
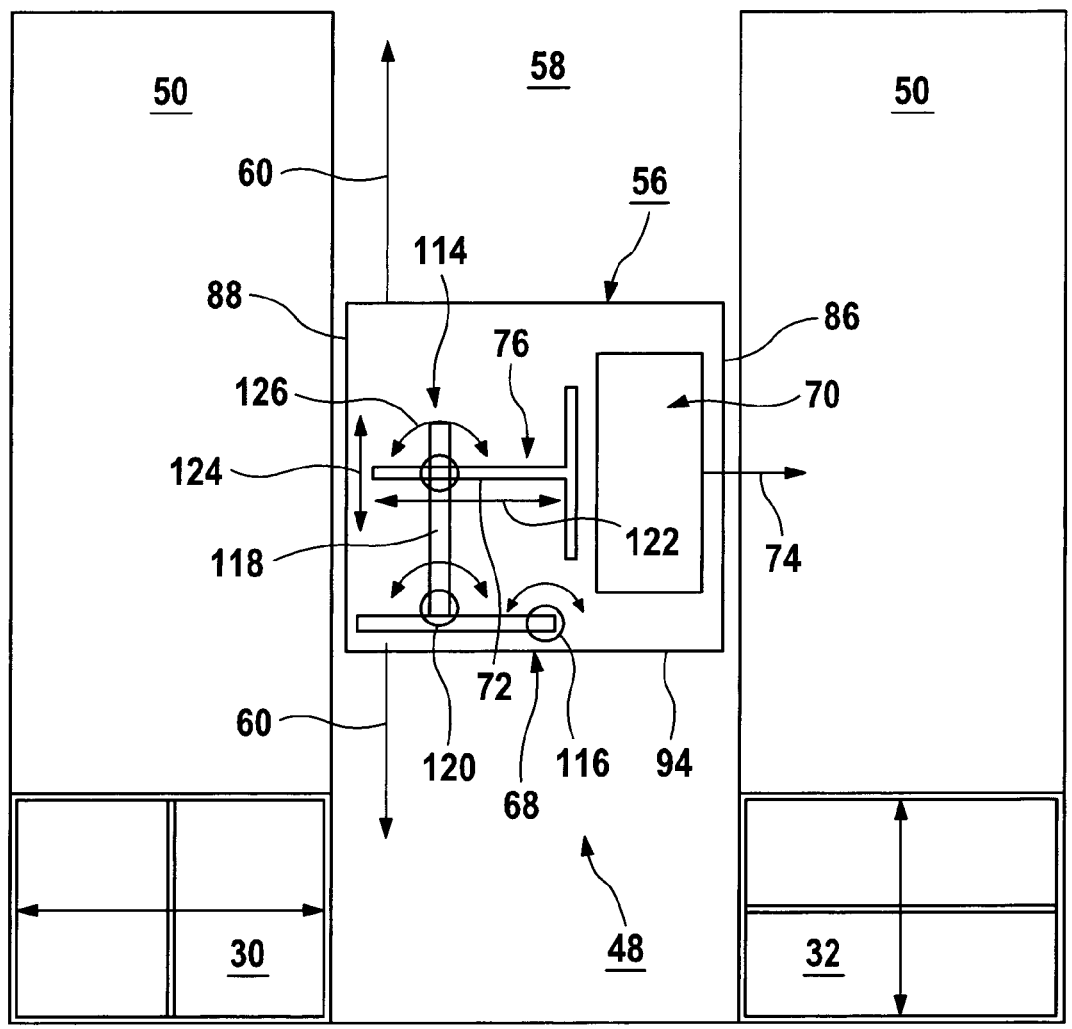
Figure 8A:
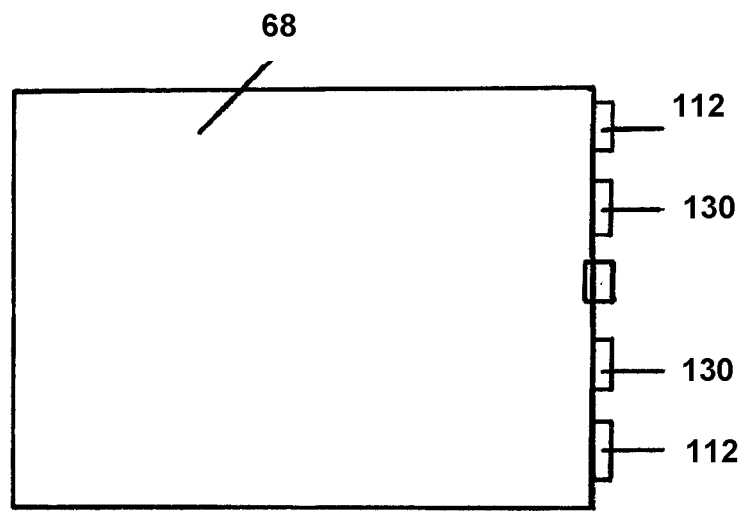
Figure 8:
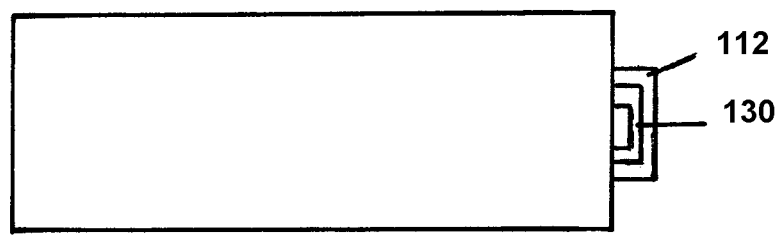
Figure 9A:
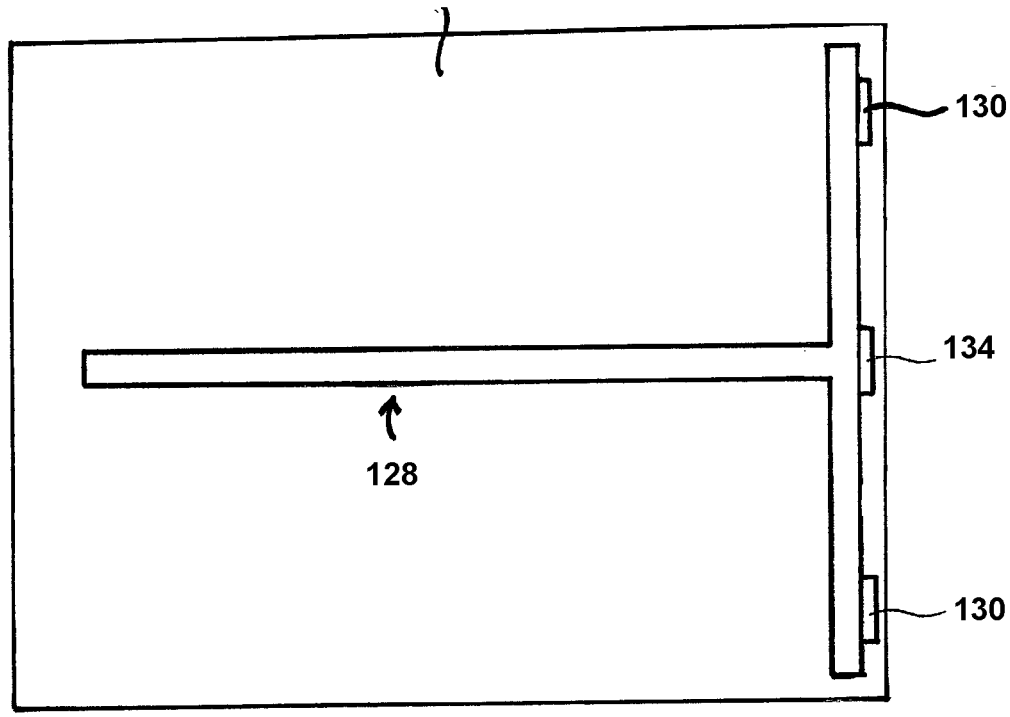
Figure 9B:
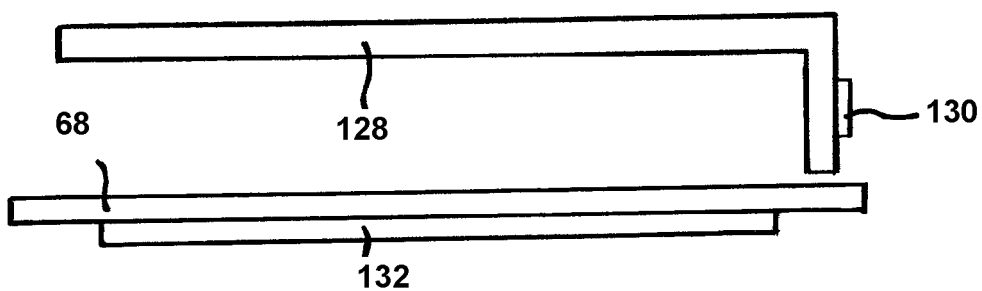
Figure 10:
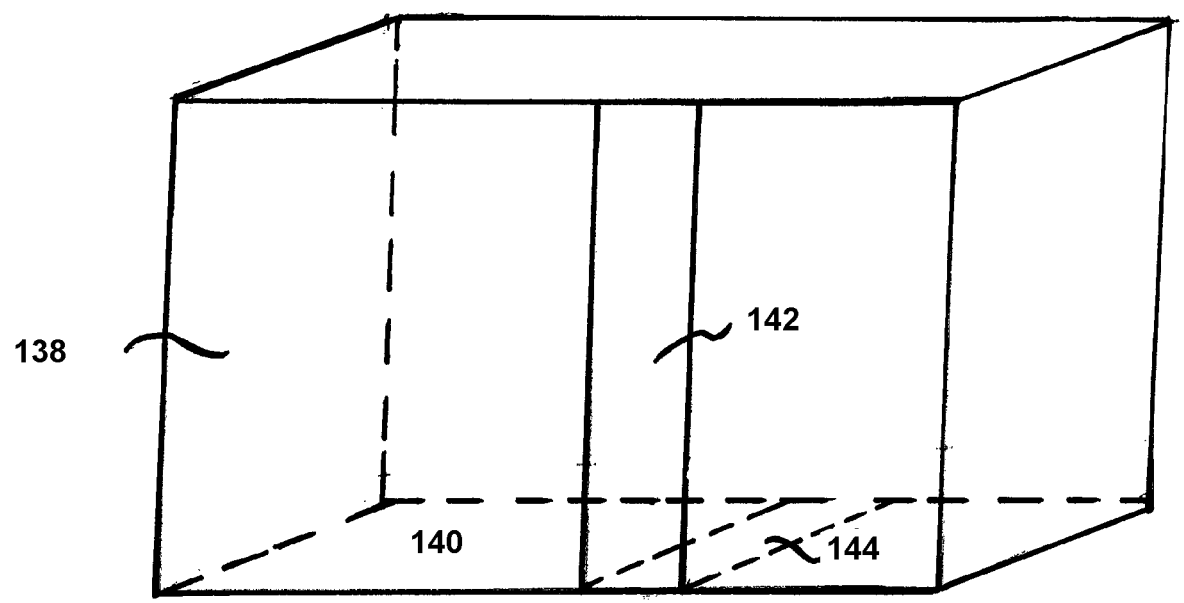
Figure 11:
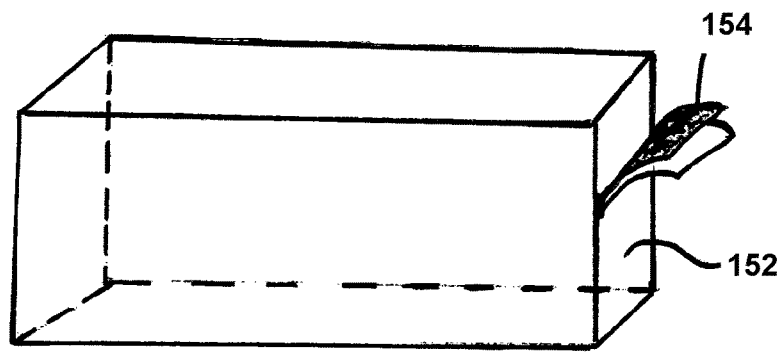
Figure 12:
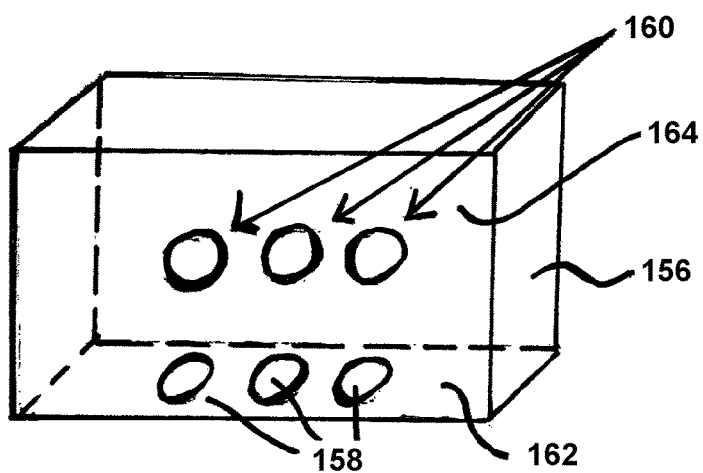
Figure 13:
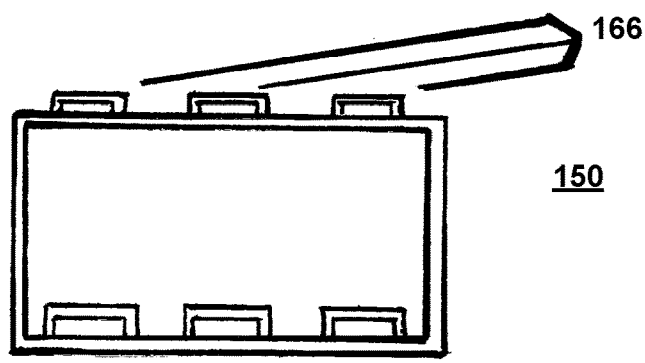

In the Drawings:

FIG. 1 Shows a schematic view of the warehouse,

FIG. 2 Shows a top view of the warehouse with an area for cars and traffic, and FIG. 3a, b Show a schematic top and side view of the warehouse and of a handling system of the warehouse, FIG. 4 Shows a top view onto a receiving/discharge apparatus of the handling system, FIG. 5 Shows a side view of the receiving/discharge apparatus of the handling system, FIG. 6a, b Shows a top view and a side view of a pushing means and/or pulling means of the receiving/discharge apparatus, FIG. 7 Shows a top view of a second embodiment of a receiving/discharge apparatus, FIG. 8 Shows a top view and a side view of a pushing or pulling means in block form with electromagnetic device, FIG. 9 Shows a top view and side view of a pushing and/or pulling means with transport surface with electromagnetic device, FIG. 10 Shows a first packaging with at least partially magnetic material such as metal strip or metal film, FIG. 11 Shows a second packaging with at least partially magnetic material such as metal strip or metal film, FIG. 12 Shows a third package with magnetic material such as magnetic deposits and FIG. 13 Shows a fourth package with receptacles for a magnetic material such as chip or coin.

1. PHILOSOPHY OF THE INVENTION 2.1 Construction and technical equipment of the warehouse
   2.1.1 Description of the construction
   2.1.2 Sketch of a construction example FIG. 1+2 see page 40+41 and description FIG. 1+2 legend for the drawings page 39
2.2 Air conditioning
   2.2.1 Temperature control
   2.2.2 Air humidity control
   2.2.3 Temperature monitoring with warning function
2.3 Input-and-discharge shaft for items
   2.3.1 Display for operating the warehouse
   2.3.2 Fingerprint sensors
   2.3.3 Scanner for reading EAN and QR codes
   2.3.4 Customer card reading function
   2.3.5 Checkout function
   2.3.6 Documentation printer
   2.3.7 Primary/secondary SD
2.4 The storage system
   2.4.1 Sketch construction example FIG. 3 page 42
   2.4.2 The shelf system
   2.4.3 The warehouse robot
   2.4.4 The packaging
2.5 Internal hardware
   2.5.1 Computer
   2.5.2 Server
2.6 Monitoring cameras
2.7 Current meter
2.8 Internet connection
2.9 Emergency current supply
3. External hardware
   3.1 Consignment terminal stationary
   3.2 Consignment terminal mobile
   3.3 Stationary fingerprint reading device
   3.4 Device with installed application for mobile communication with the warehouse
4. Software:
   4.1 Software functions for the consumer
      4.1.1 Home page "www.gourmetwarehouse.de"
      4.1.2 SD marketplace of each warehouse
         4.1.2.1 The purchase in the SD online shop of an actor
            A) Individual order
            B) Purchase from the storage refrigerator or storage freezer of the actor
         4.1.2.2 SD market hall
         4.1.2.3 SD Order just in sequence delivery and take off
         4.1.2.4 SD discount shop
   4.2 Assignment of the customer numbers
      4.2.1 SD basic customer data
   4.3 Consumer account
      4.3.1 Consumer balance
      4.3.2 Family account
      4.3.3 Forgotten package reminder
      4.3.4 SD order track
      4.3.5 SD collecting orders:
      4.3.6 Item information app
Software for the connected actor
   4.4 Warehouse manager—general warehouse manager
      4.4.1 SD DM distributor
      4.4.2 SD DM chat function
   4.5 Actors' account
      4.5.1 Customer list with clarification of the credit line
      4.5.2 Online shop of the actor 4.5.3 SD production assistant
4.5.4 SD slot calculator
4.5.5 SD consignment
4.5.6 SD MHD reminder and storage assistant
4.5.7 SD paper-case:
4.5.8 SD flyer-store:
4.5.9 SD slot share n' trade
4.5.10 SD interfaces
4.5.11 SD finance
    4.5.11.1 Operating cost computer with splitting function:
    4.5.11.2 Cash money:
    4.5.11.3 Actor debts:
    4.5.11.3.1 Open posts list:
    4.5.11.4 SD balance:
    4.5.11.5 SD finance professional:
        4.5.11.5.1 Cash money pro:
        4.5.11.5.2 SD debt collection
        4.5.11.5.3 SD debt collection pro:
4.6 Warning and emergency procedures
    4.6.1 Voltage loss
    4.6.2 Temperature fluctuations outside of previously define norm
    4.6.3 General malfunctions
5. Daniel's Gourmet Premium Marketplace
6. Daniel's Gourmet Premium Marketplace Deluxe
1.1 Philosophy of the Warehouse:

The warehouse, called "Daniel's Gourmet Premium Marketplace", "warehouse" or "SD" in the following, is a fully automated "mobile" technical apparatus that offers in an online e-marketplace to one or more connected, business actors, called actor/s in the following the possibility, by its construction and equipment in the form of hardware and software and its bidirectional interface with online capability, and by the independent using of previously defined algorithms, of presenting their business and/or their items, offering groceries or general items there and also directly in the SD, assuming orders for the actors that it forwards to them, commissioned by the latter, it conducts business with the items present in the warehouse, it assumes consignments for items with an integrated, fully automated warehouse robot, deposits them in the integrated storage shelf system in a plus temperature area as well as in a minus temperature area, it stores temperature-sensitive items properly in accordance with EU and HACCP hygienic guidelines, can independently carry out administrative and logistic tasks such as those pertaining to storage maintenance, documentation, bookkeeping, commerce and debit entry between a connected actor and a consumer, called "consumer" in the following as well as between connected actors among themselves, it makes current applications available for the communication and control of the warehouse for the actors as well as the consumers, it carries out tasks of payment transactions in cash as well as those that take place electronically between B2C (Business to Consumer) as well as between B2B (Business to Business) upon request for them, and after the consumer has achieved authority for the items in various ways it delivers them after the release by the connected actor to the consumer or to another person defined by the connected actor.

This requires a broad, qualitatively high-grade offer of items, a comfortable and clear ordering process, a simple verification in the SD and a rapid, uncomplicated payment and issuance of the items which the customer receives in a high-grade cardboard or packaging so that he can see even here that he is receiving this quality as a customer of the "Daniels Gourmet Marketplace".

The SD actor meets these modern-day demands with the offer of the SD. A cornerstone of the philosophy of the SD is the sustainable managing of resources!

Resources such as:
A) Food

When buying in the SD, the sustainable process ensures that in spite of the fact that a broad offer is made possible, an overproduction is reduced to a minimum by the intelligent planning and sale of the food.

B) Energy

The sustainability is described and met with the energy in the SD on the one hand by the coming together of very different items, different suppliers at one point, the collective delivery of them for several customers by the individual actor at this point and the use of intelligent applications such as described, e.g. at point 4.5.9 SD slot share n' trade, by increased efficiency and by the savings of electricity as well as of fuels such as gasoline or diesel fuel.

Another resource that is becoming more and more important for the future and for the modern SD customer is the "time" resource.

C) Time

The sustainability is met with time in the SD with the thoughtful use of different tools such as, e.g. efficiently designed consignment processes by the actor, by making it possible to order at any time 365 days a year by the customer, but also, as concerns, e.g. point 4.1.2.3 "SD Order Just in Sequence Delivery and Take Off" by synchronized, interlocking processes between actor and customer.

2. CONSTRUCTION AND TECHNICAL EQUIPMENT OF THE WAREHOUSE ACCORDING TO FIG. 1 TO 7

2.1 Description of the Construction

FIG. 1 shows a warehouse 10 constructed in a weatherproof manner for being set up outdoors. A basic framework of the warehouse consists of a steel skeleton in which insulated sandwich panels are constructed as wall covers and floor elements.

Figure 3B:
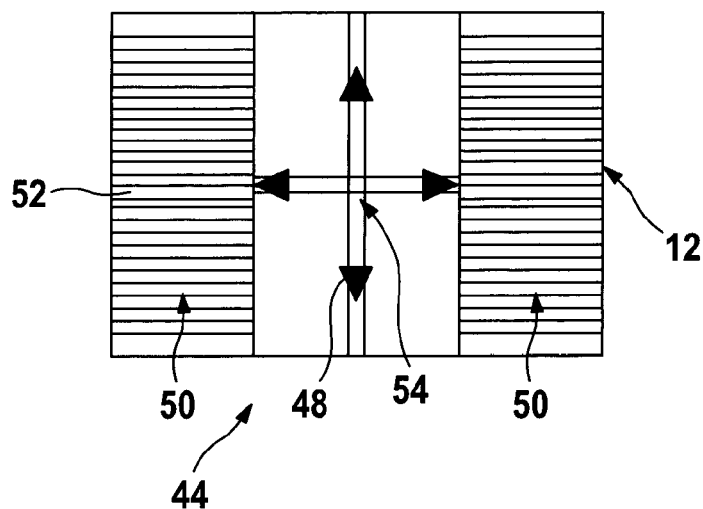

The warehouse 10 is constructed and used in different sizes and embodiments from the small mini-warehouse 10 according to FIG. 1 which can be reached by foot, e.g. at heavily frequented locations to the large warehouse 12 that optionally comprises, in addition to a refrigerating zone 14, a deep-freeze area 18 separated by a separation 16 (FIG. 3).

FIG. 2 shows the warehouse 12 in a "drive-through style" which can be reached for service from a car 20. The warehouse 10, 12 is constructed in a modular manner so that it can be expanded in accordance with the capacity required.

The roof and the walls of the warehouse serve as high-grade advertising surfaces for the gourmet warehouse.

2.2 Air Conditioning:

2.2.1 Temperature Regulation:

Since the warehouse 10, 12 is constructed for being set up outdoors, in order to be able to ensure the desired temperature in the apparatus the apparatus is equipped with an air conditioning system 22 that cools as well as heats.

2.2.2 Regulation of Air Humidity:

In order that the packagings do not suffer any damage due to high air humidity, a device 24 that regulates the air humidity is installed in the warehouse.

2.2.3 Temperature Monitoring with Warning Function:

A digital temperature recording device 26 with warning function is installed in the warehouse 10, 12 that permanently records the temperature course in the warehouse and in the case of a deviation of the actual value from the theoretical value it informs its actors online and/or by text message so that they can counteract this in order that losses due to spoilage of the items can be avoided.

2.3 Input-and-Discharge Shaft:

Depending on the size and the situation of the setup site of the warehouse, it is constructed and equipped with one or several input-and-discharge shafts 28 and/or additionally one input shaft 30 and/or one discharge shaft 32.

2.3.1 Display for the Operation of the Warehouse:

The operation of the warehouse 10, 12 takes place via an input means 34 which also meets the IP65 protection standard such as a touchscreen display. The display 32 is present at the in-and-discharge shaft 28 as well as at the input shaft 30 and at the discharge shaft 32.

2.3.2 Fingerprint Sensors:

An identification system 34 such as fingerprint sensors is optionally installed on the shafts 28, 30, 32 of the warehouse 10, 12 at which the user of the warehouse, on the part of the actors and also on the part of the consumer, is offered the possibility of verification by his own fingerprint in addition to the possibility of verification by inputting a pin, EC, credit or gourmet warehouse card.

2.3.3 Scanner for Reading EAN and QR Codes:

A detection system 36 such as a scanner is located at the input-output shaft 18 and at the input shaft 30 of the warehouse. It scans an individual identification such as a sending ID which is printed on a packet label of the item and forwards the information to a storage holding system 38.

2.3.4 Customer Card Reading Function:

as already described at point 2.3.2, the gourmet warehouse customer card is, in addition to other ones, a possibility for verifying the warehouse user, both by the consumer as also by the users on the part of the connected actors.

2.3.5 Checkout Function

A large part of the payment transactions of the Gourmet Warehouse are transacted online. However, in order to also ensure payment transactions directly with the warehouse 10, 12, each Gourmet Warehouse is provided with at least one payment terminal 40 at the in-and-discharge shaft 28 or a discharge shaft 32. Payments in cash as well as payments by debit cards such as, e.g. a post office card, electronic cash/ec cash, Maestro and V PAY and credit cards such as, e.g. MasterCard, Maestro, Visa or American Express are possible at the payment terminal.

The payment terminal 48 is integrated in or on the apparatus 10, 12 in such a manner that the removal of cash as well as the providing the terminal with change externally or by commissioned financial service providers or money transport companies is possible without them having to represent the warehouse itself.

2.3.6 Documentation Printer:

A printer 42 located directly at the discharge shaft 28, 32 prints receipts during the inputting of and discharge of shipments in the warehouse but also prints, if needed, bills of delivery and statements. The printer can also print an individual identification of an item generated by the warehouse.

2.3.7 Primary/Secondary SD:

If a company decides to become an actor of a Gourmet Warehouse, the first Gourmet Warehouse in which it becomes active is defined as its primary Gourmet Warehouse. Its main data such as, e.g. the online shop is put on the server of this warehouse. If it decides to become active as an actor for another or for several other warehouses, they are described chronologically in the sequence of their becoming active as its secondary warehouse's 1-x and are coupled to the primary warehouse of the actor.

2.4. Storage System:

FIGS. 3a and b show an embodiment of a storage system 44 comprising a handling system 46 with warehouse robot 48 and a shelf system 50 with compartments 52 in the form of slots.

2.4.1 The Shelf System:

Different sizes of the compartments 52 called "slots" in the following are constructed in the warehouse individually according to the size of the warehouse and as a function of the planned product range of items. It is possible for the system to also store rather small packets in larger slots temporarily, as long as the optimal slot is not available, by the structure of naming the individual slots in order to achieve an optimal utilization of the SD.

If the system stored a rather small packet in a larger slot, it recognizes as soon as the optimal slot becomes free and then transfers the packet over independently so that no space capacity is lost.

The storing in and out of the items is assumed by the handling system 46 with a completely automated warehouse robot 48 that is guided on a rail system 54.

The warehouse robot 48 can receive packets with different sizes and shapes on the item in-and-out shaft 28, 30, independently store them in the slot given to it by the system, pick them up again on the command of the system and discharge them again at the discharge shaft 32.

FIGS. 4 and 5 show a top and a side view of an embodiment of the storage system 44 according to FIG. 3. The warehouse robot 48 comprises a receiving/discharge unit 56 that is arranged so that it can travel along the rail system 54 in a Y-Z plane in an intermediate space 58 between the shelves 50 in the direction of the arrows 60, 62. The rail system 54 comprises horizontally running rails 64, 66 and vertically running rail 66 that extends between the horizontally running rails 64, 66 and is received in them at the end side in a movable manner The receiving/discharging device 56 is arranged so that it can travel along the vertical rail 66 in a horizontal direction according to arrow 68 in order to be able to control the individual compartments 52 of the shelves 50.

FIG. 4 shows an embodiment of the receiving/discharging device, wherein it comprises a storage surface 68 onto which the items 70 are transported. The item 70 is movably arranged on the transport surface 68 so that can be pushed by a pushing means 76 in the direction of the outer 74 into a shelf compartment 52. The pushing means 76 is movably arranged in the direction of the arrows 78, 80, i.e. in the X-Y plane. The pushing means 76 is constructed in a T-shape and comprises a first shank 82 and the second shank 84 that is aligned substantially at a right angle to the first shank 82 and parallel to transverse edges 86, 88 of the transport surface 68.

A linear drive 89 comprises guide rails 90, 92 running parallel to or substantially parallel to longitudinal edges 94, 96 of the transport surface 68. A transverse rail 98 extends between the guide rails 90, 92 and can travel along the longitudinal rails 90, 92 in the direction of the arrow 100.

The pushing means 76 is supported by its first shank 82 in a movable manner on the transverse rail 98 and can travel in the direction of the arrows 78, 80. In addition, the shank 82 and therefore the pushing means 76 are rotatably supported in the direction of the arrow 102 about a shaft 104 running in the direction of the Z axis in order to make it possible that items 70 can be drawn in both directions onto the support surface and pushed from the transport surface into compartments 52.

A preferred embodiment provides that the transport surface is pivotably supported in the X-Z plane in order to make it possible that items 70 slide from the transport surface into a shelf compartment 52 and that the pushing process is supported.

FIG. 5 shows a side view of the receiving/discharging device 56, from which it can be gathered that the transport surface 68 comprises lateral limitations 106, 108 that extend in the longitudinal direction of the transport surface 68 so that they substantially form a U shape. The lateral limitations 106, 108 prevent the item 70 from becoming fixed on the transport surface 68 upon a movement of the receiving/discharging device in the Y-Z plane, in particular in an X-Y direction. As a result, very great accelerations of the receiving/discharging device 76 can be achieved.

Figure 6B:
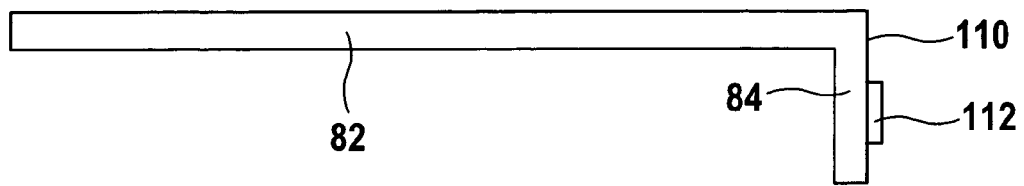

FIG. 6a shows the pushing means 76 in a top view whereas FIG. 6b shows the pushing means 76 in a side view. The pushing means 76 comprises the longitudinal shank 82, which is movably and rotatably supported in the linear drive 89. The transverse shank 84 runs at a right angle to the longitudinal shank 82 and has a front surface 110 which rests against the item 70 when the item is being pushed.

In order to attract the item 70 the surface 110 can comprise suction means 112 such as a vacuum suction apparatus with which the item 70 is aspirated and can then be drawn onto the transport surface.

FIG. 7 shows a top view of a second embodiment of a receiving/discharging device, wherein the pushing means 76 is arranged on a grasping arm apparatus 114 which comprises a first arm 116 parallel or substantially parallel to the longitudinal edge 94 of the transport surface 68 and comprises a second arm 118 which is connected by an articulation 120 in an articulated manner to the first arm 116. The pushing means 76 can travel along the longitudinal rail 118 in the direction of the arrows 114, 122, 124 and is rotatably supported in the direction of the arrow 126 so that the elements 116, 118 in combination with the pushing means 76 form an articulated arm.

Consequently, the pushing means 76 can be controlled by the grasping arm apparatus 114 in such a manner that that the item 70 can be taken to the two longitudinal sides 86, 88 of the transport surface 68 and discharged.

The embodiment of the invention brings it about that the items 70 and/or item consignments do not have to be transported to the storage location by a complicated or expensive grasping technique but rather are pushed by the pushing means 76 such as a pusher to the reception and during the storing-in/storing-out process.

After the item 70 and/or item consignments determined for being stored in have been placed into the item entry lock 30, 32, which can also be designed at the same time as an item exit lock, the pushing means 76 draw the item 70 and/or the item consignment onto the transport surface 68, which is constructed in a U shape. The item 70 is fixed in such a manner that that it is fixed during the storing-in movement by lateral edges 106, 108 of the U-shaped transport surface 68. For the case in which the transport surface 68 is not constructed as a U shape, the limitations 106, 108 can also be constructed differently.

Once it arrives at the storage location, e.g., at compartment 52, the pushing means 76 pushes the item 70 from the transport surface 68 into the compartment 52 of the shelf 50.

During the discharge process the pushing means 76 draws the item 70 onto the transport surface 68 and places it on the opposite limitation, which can also be constructed with a U shape. The item 70 is then transported to the item discharge lock and/or item entry lock 30, 32 where the item 70 can be pushed out by the pushing means 76 into the lock 30, 32, which can also comprise a conveyor belt.

The pushing means 76, which draws or pushes the item 70, can be constructed in different ways, for example, by shafts or rails 98, 100 or 116, 118 constructed in the form of linear drives 84 and 114, or are driven and controlled by an articulated robotic arm.

FIG. 8) and FIG. 9) show a further embodiment of a pushing and/or pulling means 128. This embodiment is characterized in that the pushing and/or pulling means comprises an electromagnetic device 130 such as electromagnet, whereby the items or an item consignments comprising the magnetic or ferromagnetic areas or a magnetic or ferromagnetic packaging receiving the item is fixable when pushing or pulling.

In this embodiment, it is further provided that the transport surface 68, which transports the items and/or item consignments, has an electromagnetic device 132 such as electromagnet, whereby the items and/or the item consignment is fixed during transport.

The illustrated embodiment is further characterized in that the pushing and/or pulling means has a recognition device 134, such as camera, whereby the position of the items and/or item consignment is detected before pushing or pulling and the pushing means and/or pulling means position itself so accurately to safely move the items and/or item consignment.

FIG. 10 shows a first package 136 according to the invention for receiving items and/or item consignments, wherein at packaging sections 138, 140, at which the package makes contact with the electromagnetic devices 130 of the pushing and/or pulling means 128 and makes contact with the electromagnetic device 132 of the transport surface 68, has a thin layer 142, 144 of magnetic or ferromagnetic material such as metal film is incorporated.

The metal film is used by the electromagnets 130, 132 located on the pushing and/or pulling means 128 and/or the transport surface 68 and fixed so that the item and/or item consignment can be moved quickly and safely.

To move the items and/or item consignments safely, a camera 134 is additionally attached or integrated on or in the pushing and/or pulling means, with which the pushing and/or pulling means can automatically move to the best position to optimally fix the items and/or item consignment.

FIGS. 11 to 13 show further embodiments of magnetic packages 146, 148, 150, which are formed in different formats and sizes.

The package 146 is formed of a composite 152 having an insert 154 of at least one magnetic or ferromagnetic material. The composite 152 comprises at least one material of a material in the form of a partial or full-area film, or partial or full-area mesh with magnetic or ferromagnetic properties.

FIG. 12 shows the packaging 148 of a non-magnetic base 156, provided with elements 158, 160 of a magnetic or ferromagnetic material. This version is particularly resource-saving. In package 148, one or more materials 158 having magnetic or ferromagnetic properties, e.g. equipped on an inner or bottom side 162 and/or on an outer side 164 and/or glued in a particular embodiment with such a magnetic material or fixed by another type.

FIG. 13 shows the packaging 150, which is equipped with one or more materials 166 with magnetic or ferromagnetic properties consisting of disposable or reusable chips or coins of the payment transaction inside and/or outside. In a particular embodiment with such a magnetic or ferromagnetic material consisting of magnetic or ferromagnetic chips or coins of the payment traffic they can be glued or fixed by a different kind or be in recordings.

The storage system 44 can be constructed with a lock 30, 32, which can either be an entry lock or a discharge lock, and can also be constructed with at least one or several separate entry locks and one or more separate discharge locks.

The described invention makes it possible that item 70 and/or item consignments for different sizes and weights can be stored in and out very rapidly by using very economical technical means.

Moreover, it is achieved with very little technical expense that as a consequence of the fact that items 70 or item consignments of different size are not grasped or must be attracted by vacuum, technically expensive drawer systems can be eliminated and at the same time a very high utilization of the storage space is achieved.

If the storage system is constructed not only with a lock that serves at the same time as in in-and-out lock but is constructed and equipped with at least one or more input storage locks or one or more outlet locks, the advantage is achieved that the handling unit can be active for the item receiver and/or item consignment receiver and at the same time items and/or item consignments can be entered into the system through the separate item input locks which the handling unit then transports at a later time to the storage location.

2.4.4 Packaging:

In order to achieve a problem-free operation of the warehouse robot it is preferably necessary that all items or articles and consignments stored in the warehouse 10, 12 are packaged in cardboard such as folding carton according to the invention.

It is advisable for hygienic reasons that the item in the folded cardboard is additionally packaged fused in sealed shells or film bags. In this manner the transfer of odor and taste of various items such as, e.g. fish, cheese, meat and fine bakery products is excluded, which makes it possible for the SD to therefore offer a very great number of products.

2.5 Internal Hardware:

2.5.1 Computers

The computing power is taken over per warehouse 10 preferably by two computers 128 such as industrial PCs in accordance with the IP65 protection standard. A first PC performs the required computer work and on a second PC all computing processes for the securing of data are stored in a mirrored manner. If the first PC breaks down, the second PC then assumes the computer work.

2.5.2 Server:

Two IP65—protected servers 56 are installed per warehouse as was the case for the computers. One server that can access the various systems and one server on which the data is available in a mirrored manner which in the case of a server problem assumes its work.

2.6 Monitoring Cameras:

In order to prevent the danger of vandalism the warehouse is optionally watched by video at various locations around and inside the warehouse.

2.7 Current Meter:

The SD is selectively equipped with its own current meter in order to ensure a precise invoicing of the operating costs of the SD in case of a current connection which is not its own or a using by several actors.

2.8 Internet Connection:

Depending on in which region the SD is used, different data transfer rates are available, as is to be expected.

In order to ensure a smooth operation of the SD, it is selectively equipped with a permanent telephone connection and/or a radio connection for connecting the SD to the Internet.

2.9 Emergency Current Supply:

In order to avoid as best as possible damage to be expected due to a loss of voltage, the SD is equipped with constantly charged emergency batteries. Their capacity is designed to A) make possible emergency procedures as described in point 4.6.1, and B) to maintain the refrigerating function of the SD as long as possible.

3. EXTERNAL HARDWARE 3.1 Stationary Consignment Terminal:

A data interface which is adapted for market-leading sellers such as, e.g. Bizerba, Mettler Toledo or Berkel is installed in the warehouse software in order to possibly be able to use already present hardware belonging to the company such as, e.g. modern loading balances and interlinked checkout systems in accordance with an independent concept of the invention.

The complete consignment terminal consists, if there is no partially compatible hardware for the consignment present, of an operating display with connected or integrated, Internet-capable PC, a balance connected to the PC, a printer on which delivery notes are printed and a label writer on which codes for the shipment are printed, as a function of the product range of the actor.

Depending on the planned setup location the consignment terminal is also offered and delivered in a construction in accordance with IP-65 suitable for wetting rooms and freezer rooms.

3.2 Mobile Consignment Terminal:

The mobile consignment terminal is identical in its functions with those of the stationary terminal, see pos. 3.1; however, all components are present here in a transportable housing. The components are also optionally in a design protected by IP 65 and obtainable equipped with mobile Internet access.

Such a terminal could be interesting for actors that would like to prepare mobile items for a later delivery to the warehouse, for example, parallel to the weekly market business or to a house-to-house delivery business.

3.3 Stationary Fingerprint Reading Device:

If the actor decides to offer his customers the possibility of verification, it is possible, not only in the warehouse but also in accordance with the invention also in the main store or in a branch, to scan and store in the system the fingerprint of persons who would like to be verified without complications in the warehouse.

3.4 A Device with Installed Application for Mobile Communication with the Warehouse.

Internet-capable: mobile data protection device in MDE, tablet PC or smart phone with which the actor is able at all times to communicate in a mobile manner with the warehouse.

4. SOFTWARE 4.1 Software Functions for the Consumer:

An invention with independent nature refers to a distribution system with warehouse.

4.1.1 Home Page www.Schlemmerdepot.de:

The purpose of this home page is that the customer can find information about the functions of the SD and the SD or SD's that he can reach and use.

Once he arrives at this home page, he meets Daniel.

In distinction to customary home pages, it is planned here that the customer can read his information but can also find out about the possibilities offered to him by the SD by an animated figure, depending on the data transmission rate available, similar to a modern video game.

The customer has the possibility of finding the gourmet warehouse that is the closest for him via the SD finder. This takes place via the map view as well as via the search according to zip codes and via the surrounding area search.

4.1.2 SD Marketplace of Each Warehouse:

If he now calls the warehouse he goes directly to the warehouse's own server!

The warehouse is mobilely self-sufficient and can be used at other locations without an external server!

On the home page of the SD the customer arrives at the virtual marketplace in accordance with the data transfer volume and the desire of the actor.

The SD is designed in such a manner that that not only one actor but also several actors offer use.

The customer now has the possibility of opening the online shop of a connected actor or the SD market hall (see point 4.1.2.2).

4.1.2.1 The Shopping in the SD Online Shop of an Actor:

The customer now has the possibility in the online shop of the actor of

A) making an individual order, or
B) activating a purchase from the storage refrigerator or the freezer of the actor.

A)
Individual order:

The actor has the possibility here via a bidirectional interface of coupling a databank of his inventory to the online shop in order to be able to offer the customer items in a binding manner, or he has the possibility, without using this function, of offering items to the customer according to their availability in a non-binding manner. In this case he can give the customer the possibility of alternatives for the case that a desired article such as, e.g. a certain meat cut is not available but a comparable product is available, however, from the butcher.

However, the customer can decide in the case that one or more articles of the order made by him cannot be delivered that the remaining order remains valid or should be canceled with notice.

Since particularly in the area of meat and sausage consignments are concerned that are freshly weighed, the customer has the possibility of giving the actor a range of decision-making in order to allow him, e.g. to make a 10-15% increase in the delivery amount without an extra confirmation.

Delivery options of the individual order:

The actor determines which of the possible delivery variants he offers:
1. Shipment by mail or shipping company
2. Pick up in the main business or in a branch
3. Delivery of the shipment by a home delivery service belonging to the company
4. Delivery of the shipment to a gourmet warehouse.

In variants 2 and 3 the actor has the possibility, after the previous release by the client, of depositing the items shipment in a gourmet warehouse as an alternative for the customer, whose item shipment was not picked up during business hours by the customer in the case of 2. or in the case of 3. the client was not at home.

In this case the MDE (Mobile Data Detection Device, see point 3.4) is used perhaps for No. 2 but is used for No. 3.

If the shipment does not reach its receiver for, e.g. the above-cited reasons then the actor or the person authorized by him for the delivery can check an availability of the storage capacities operated by the actor and appropriate for the space requirement of the shipment with the MDE and the using of "4.5.4 SD slot calculator" in an SD operated by the actor and immediately reserve these capacities if available.

The MDE then generates a shipment access code for the case that the customer does not have his own consumer account, see point 5.

This shipment access code and the estimated arrival time of the shipment in the warehouse is sent to the customer selectively by SMS, email or post office box shipment.

The customer has the possibility with this access code or the consumer account at the points 2., 3. and 4. of receiving his item shipment in the SD.

B)
Purchase from the from the storage refrigerator or the freezer"

This purchase concerns items that the actor has already determined and deposited in the warehouse for the direct sale to the end customer.

In distinction to the individual order, the customer also has the possibility here of selecting items in the SD from the items available in the SD, of buying them and of directly receiving them.

4.1.2.2 SD Market Hall:

In the SD market hall the customer has a total view over
A) All articles located in the warehouse, all actors that make offers from their storage refrigerators and/or storage freezers for direct sale.
B) All items that can be delivered by individual orders by the actors associated with the SD.

4.1.2.3 SD Order Just in Sequence Delivery and Take Off:

"SD order just in sequence delivery and takeoff" is the manner in which the binding purchase contract between customers and actors comes about after the inquiry of the customer about a precise delivery time and a binding confirmation of the same by the actor.

Depending on the AGBs of the actor for this model, it is possible, e.g., that if the actor does not deliver on time, a certain monetary amount, a fixed amount or a percentage amount corresponding to the value of the order is credited to or paid to the customer, or if the customer does not pick up the delivery on time, it is charged to him entirely, only partially or also, due to disposal costs produced, with an additional charge after agreement, but the item comes back into the possession of the actor or remains in his possession and is available for him as described, e.g. in point 4.1.2.3 SD discount shop.

This procedure is interesting, e.g. for customers for which the SD is located on a stretch such as, e.g., the way to his home or to his work but they do not want to accept any waiting times at the warehouse.

Once the shipment reaches the warehouse the customer is informed by mail. If this takes place at the agreed-on time the item is charged. If the customer can pick it up he can sell if further on the free market with financial losses.

When this method is used it is recommended for reasons of anonymity and of data protection regarding the original customer to not attach the delivery notice or the invoice directly on the item consignment but rather to issue it by the document printer described at point 2.3.6 only upon pickup.

4.1.2.4 SD Discount Shop

Items are offered "reduced in price" or "free" in the SD discount shop which are qualitatively unobjectionable but are close to the expiration date for maximum shelf life (MHD).

They can be items from the storage refrigerator or storage freezer which were not sold but also individual orders which were sold but not picked up by their receiver and are not freed for further sale in the sense of the general business conditions, or consignments which were not delivered by the actor in accordance with the agreed-on time, see point 4.1.2.3, and which are now not being accepted by the customer.

4.2 Assignment of the Customer Numbers:

In order to make it possible to use certain functions the assignment of the customer numbers is assumed by the SD independently of which actor or actors associated with the SD a person might be a customer of.

4.2.1 SD Basic Customer Data:

In the basic data the customer indicates the desired address for invoicing, the delivery address in the case of using the home delivery service and any SDs accepted for alternative delivery if one or more other SDs are available in a certain area and if so, which prioritization in which sequence is desired, indicates his email address and the contact telephone number. A visiting card is prepared for the customer with this data with which, as soon as the customer would like to place an order with an actor, it is taken from his actor account.

4.3 Customer Account:

4.3.1 Customer Balance:

In addition to the data that the customer made as basic customer data at 4.2.1, the customer will receive in the customer account a complete list of his purchase activities. He will receive a differentiated listing of all his purchased and already paid items as well as an exact listing of his still pending obligations.

4.3.2 Family and Care Account:

The family account in the gourmet warehouse.

Here, for example, married couples or life partners can use an account jointly. In addition, it is also possible here that a budget can be set up for their children or other third parties which can be, for example, godchildren or also people who have economic difficulties or are in difficult social circumstances which the account holder would like to take care of, and who would independently have access to this budget when making purchases in the SD.

The account chief can for every individual co-user of his account authorized by him on the one hand determine a very detailed budgeting, e.g. individual daily, weekly or monthly budgets that are added or dropped if underused and on the other hand, however, can also determine by blocking certain articles which items may be acquired independently by the co-user.

The co-user authorized by the account holder has, in the case that the account chief made a pre-selection of the items to be acquired by the co-user, only this offer visible in his personally usable SD applications. This is especially important when, e.g. parents would like to influence the nourishment of their children.

Therefore, children can then, e.g. independently make a selection about which school sandwiches they would like of pick up in the warehouse on the way to school, or which convenience article freshly prepared by an actor they would like to pick up in the SD after the school.

The account chief obtains, if desired, information about all events concerning his account.

With this function parents have, e.g. the possibility of making possible a qualitatively valuable, cashless supply of groceries even in their absence.

4.3.3 Forgotten Package Reminder:

Since no items whose expiration date was exceeded are allowed to be deposited in the gourmet warehouse for hygienic reasons, the customer will be explicitly informed by the 4.3.3 forgotten package reminder before the expiration of the MHD about this before the expiration of the expiration date of his purchased items that were, however, not yet received and are still deposited in the SD in order to protect him from the loss of these items.

4.3.4 SD Ordertrack

SD Ordertrack is an app that makes it possible for the customer to view the delivery status of his orders at any time.

4.3.5 SD Collecting Orders:

SD collecting orders is a function in which the customer can communicate to the actor that he is expecting even other orders from other actors at his planned item pickup time. The customer as well as the actors will receive in this case a listing of the current delivery statuses. It is conceivable to integrate an advertising function here in order to optimize the service for the consumer by an increased incentivizing among the actors.

4.3.6 Item Information App:

An application is made available for the customer from the SD in which he can determine in a purposeful manner about which items available in the warehouse he will receive information. Therefore, he will be immediately informed, e.g., if an actor stored for sale in the warehouse a certain article which had been previously marked by the customer.

The customer can be informed about individual articles, certain actors up to all articles of all connected actors of one or more SDs. Therefore, the customer avoids an undesired flood of information and can still find out about the availability of items that he previously put in his favorites list.

4.4 Warehouse Manager—General Warehouse Manager:

Every actor connected to an SD defines a contact person, called a "DM" or warehouse manager" in the following who is authorized to deal with the SD. The SD communicates continuously in a bidirectional manner with this DM.

The SD imparts to him in advance set information by SMS and/or email, grants him insight into the information set by the actor and carries out orders which it obtains from the DM.

A general warehouse manager, called the GDM in the following, is selected from all DMs for each SD. This GDM is provided by the actor with special competencies in contrast to the other DMs in order to make possible a smooth operation of the warehouse as the main contact person of the DM.

Any compensation for expenses to be agreed upon which is to be credited to the actor who appoints the GDM is automatically updated in the 4.5.11.1 operating expense computer with splitting function and updated into this calculation of these operating expenses.

4.4.1 SD DM Distributor:

The SD DM distributor is an email setting in the SD that simultaneous informs all DMs of an SD and the GDM together.

Therefore, they can all be informed rapidly about certain information such as, e.g. a relevant temperature fluctuation indicating a problem with the refrigerating of the SD.

4.4.2 SD DM Chat Function:

Each SD is provided with a chat function for the DMs and the GDM.

Similar to a meeting of market suppliers, any situations can be jointly discussed among the actors without them having to accept time-consuming meetings.

4.5 Actors' Account:

4.5.1 Customer List with Explanation of the Credit Line:

If a customer would like to register in the online shop of an actor as such in order to be able to activate an order, the actor will request basic SD customer data of his visiting card under 4.2.1. The actor now revocably determines in a manner that can be changed at any time whether and at which amount he will grant a credit line to the customer. The actor then sends this data to the SD again.

This is necessary in order that the SD has clear instructions regarding the release of the items during the placement of purchases of the customer in the 4.1.2.2 SD market hall or the 4.1.2.3 SD discount shop. If the actor does not give the customer a sufficient credit line, the customer cannot make any reservation of items when shopping in the SD market hall and the discount shop in advance and can only receive items against direct payment in cash or ecash in the warehouse.

4.5.2 Online Shop of the Actor

As already described at point "4.1.2.1 The purchase in the SD online shop of an actor", an interface is defined here with which it is possible to couple a databank to the shop in which databank the current storage inventory of the actor is described in order to be able to directly confirm item shipments to the consumer.

If this possibility is not utilized, the actor has the possibility of not confirming orders until after a check is made.

However, the online shop also gives the actor the possibility of defining for each article certain individual as well as total order amounts in conjunction with certain parameters. Therefore, the online shop can independently confirm item consignments which have not yet been produced but which the actor can produce by the delivery time.

Therefore, the online shop of a butcher's shop can confirm, e.g. wiener sausages for a customer, knowing that they are produced on Thursdays, in an amount limited by the set parameters for delivery on a Friday or later.

The sum of all ordered articles is automatically made available to the 4.5.3 SD production assistant and the individual orders are made available to the 4.5.4 SD slot calculator for further processing.

At the moment of the placing of the order or the confirmation of an individual order by the actor the system predicts two or three packaging variants for the item shipment, taking into account parameters such as the weight and the size set by the actor and which can be changed at any time by practical experience, at least one but possibly also two or three packaging variants of the item shipment even in a prioritized sequence. After inquiry in the 4.5.7 paper case about the availability of the calculated packaging materials the online shop makes an inquiry at 4.5.4 slot calculator about the availability of the storage capacities in the SD desired by the client or also in "the" gourmet warehouses" made available by the customer by his data in the basic SD data.

The order cannot be confirmed to the customer until a confirmation of storage by the SD slot calculator has taken place.

The confirmed and reserved packaging variant made available by the SD slot calculator is added to the order and serves later in practice as indicating the package during the consigning.

Furthermore, the system generates for each confirmed order a personal QR or EAN code which also accompanies the item until discharged with which the history of the consignment can be reproduced at any time.

4.5.3 SD Production Assistant

SD production assistant is an application which enormously simplifies the production planning for the actor after a previous learning phase by user-defined data.

The app permanently communicates with the 4.5.2 online shop of the actor as well as with the application 4.5.5 SD consignment.

It adds the ordered items into the production calculation and subtracts already consigned items. It offers the possibility of managing an item inventory databank whose data is also updated into the production calculation.

The actor has the possibility of displaying not only the total amounts of individual items still to be produced but to also do this in a step-by-step manner within individual production stages. For example, "1000 wieners still to be produced, 300 by Aug. 4, 2013, 300 by Aug. 5, 2013 and 400 by Aug. 6, 2013.

This takes place not only in text but also if desired in visual form as a diagram.

The app automatically calculates, including formulations belonging to the company, the still-needed amounts of material necessary for the production of the items. This also takes place in relation to the deadlines at which the items are needed and can take place in text as well as in visual form.

There is also the possibility here of coupling a material databank in order to show the actor not only a listing of the required amounts of material for processing the ordered items but can also prepare a recommendation for purchasing materials for him with the required value and contents of the individual items.

4.5.4 SD Slot Calculator

The SD slot calculator organizes, plans and carries out a record of all SD slot matters of the primary as also of the secondary SDs of an actor. It permanently communicates with 4.5.2 online shop of the actor, 4.5.5 SD consignment, 4.5.6 SD MHD reminder storage assistant and 4.5.9 SD slot share 'n trade.

4.5.5 SD Consignment

The consignment software also communicates with different applications of the SD.

It receives its orders from the 4.5.2 online shop of the actor. The actor has the possibility of providing his item list with different characterizing numbers so that the consignment software can independently split orders and send them to different consignment terminals so that coworkers in different and also in the same departments can process common consignments simultaneously and even in a time-delayed manner which are then jointly moved out of the warehouse and can be given to the customer.

Thus, in the example of a butcher's shop a coworker can process all sausage components of all consignments while another coworker processes all meat components during, before or afterwards.

SD consignment takes the item ID code defined by the online shop and independently generates, if necessary, other ones which are then stored as belonging to the consignment.

SD consignment gives the coworker the previously calculated and therefore already reserved packages in the warehouse. If a suggested package or a package combination should turn out in practice not to be available for the order, then the coworker has the possibility of allowing other package variations to be checked during the consignment process by the 4.5.4 SD slot calculator and of changing them if possible.

4.5.5 SD commission reports used-up packages immediately to 4.5.7 SD paper case. There is the possibility of carrying out the arrangements in such a manner that 4.5.5 SD consignment either combines the consigned article items and a common delivery note at the end of the consignment procedure; however, the system can also split an order into a different delivery notes that belong together or are treated separately. This is in particular advantageous if an exact bookkeeping separation is desired or necessary between individual departments in the company of an actor.

The delivery note or notes can be only printed but can also be sent to the customer after the finishing of the consignment process by email.

If individual articles of an order should no longer be deliverable, then the system automatically sends a message to the customer so that he is informed and able to optionally order replacement early for the lacking items.

Nevertheless, the software places a bookmark here that is necessary for the function 4.3.4 SD Ordertrack for tracking the order.

4.5.6 SD MHD reminder and storage assistant

Every item consignment receives a minimum expiration date which is a function of the article with the shortest expiration date in the consignment.

While the SD reminds the customer about his items as described at 4.3.3 Forgotten Package Reminder, in the SD MDH reminder and storage assistant the actor is made aware of the items still in the warehouse but shortly before the expiration date.

There is the possibility in the warehouse with a freezer variant that the storage robot moves articles, according to previously set method steps automatically or on the instruction of the DM, which articles were offered stored in the fresh product area into the freezer area.

Once this takes place, the SD MHD reminder and storage assistant orients itself to the new freezer MHD and automatically changes the status of the shipment in the online shop of the actor and in the market hall.

The actor permanently receives the possibility by the 4.5.6 SD MHD reminder and storage assistant of obtaining a report about the entire status of his SD activities—how high the item value is of his own items still in the warehouse? Which ones of them were already sold? Which ones are being freely offered? How high was or is the storage location workload?, etc.

4.5.7 SD Paper Case:

The actor has the possibility in his actor account on the server of the gourmet warehouse of designing the layout and the shaping of his packages according to his own wishes and ideas with the application SD paper case, called SDPC in the following.

He selects cardboard boxes that are optimal for him from a list of cardboard boxes or packagings of different sizes and formats receives the basic layout and the logo of the gourmet depot suggested, can change the layout, add his own texts, store the designs and templates there and, after the finishing of the layout, order the packagings directly from the manufacturer.

SDPC monitors the inventory of the packaging means.

SD paper case, as soon as a packaging is registered as used in the consignment procedure, transmits this information to the app and SDPC subtracts this packing item from the inventory.

The actor determines a minimum storage supply for each packing item as soon as he defines his first packaging inventory in the SDPC. If this supply is dropped below during the consignment procedure, the SDPC reports this to the DM and suggests ordering the particular packing item in an amount previously basically defined by the actor.

The DM has the possibility of changing or not changing the ordered amount, and if he corroborates the ordering suggestion of the app the packing items are automatically ordered from the manufacturer in accordance with the previously defined conditions.

The SDPC generates a shipment-specific QR or EAN code here which is shipped with the order to the manufacturer and accompanies it up to the receipt of the item in the company of the actor.

Once the item shipment reaches the company of the actor and the code is scanned on the consignment terminal, SDPC registers the type of the packing items and the number of them as inventory input and adds them in the particular inventory list of the individual packing item.

SDPC compares the consumption of the packing items in a manner appropriate to the period with that of the previous years and suggests, in the case that a generally elevated consumption is recorded but also if a temporarily increased greater consumption is to be expected by an increased requirement conditioned by the season, e.g. at Christmas, an increased order amount of the packing items to the DM.

4.5.8 SD Flyer Store

In a manner similar to the point described for the function of the warehouse paper case, the actor receives the possibility in the gourmet warehouse flyer store of invoking this program on the server of the gourmet warehouse in his actor's account and of using templates, designing advertising means such as flyers, brochures, placards, banners, etc. with his own texts as well as images and logos and of ordering them directly from the manufacturer.

4.5.9 Slot Share n' Trade

Each actor of a warehouse has the possibility of conducting trade with his storage resources.

Trade can take place in the "warehouse slot trade" among the actors of a warehouse who have declared themselves ready to trade, in the "global warehouse slot trade" but also among the actors of different warehouses.

Every actor who has declared himself ready to trade with his storage locations will flexibly determine how much of a percent of his "non-taken or reserved" storage places he will make available to the slot exchange, to the trade with storage locations" and under which conditions.

At the same time the actor will define according to which priorities the purchase of required storage capacities should proceed. Should free storage capacities be purchased in a purposeful manner by friendly actors? Does the purchase go according to the best price?, etc.

If SD slot share n/trade should not have any SD slots available that are open for being freely allocated to the market by the actors but it nevertheless recognizes free capacities with connected actors, then the system inquires via the DM of the actors which ones have free slot resources and allocates them according to a special release.

4.5.9 SD Slot share n' trade documents all movements and allocations of warehouse slots and establishes for every actor, according to previously set parameters in time for each of its trading actors, debts vis-à-vis other actors and forwards them for the purpose of processing to 4.5.11 SD Finance 4.5.10 SD Interfaces In the system of the SD interfaces are defined in an actor-specific manner at various points in particular to make possible the integration into existing operating systems and the utilization of them.

Therefore, e.g. company balances and item management systems as well as financial bookkeeping systems, abbreviated FiBu, can be connected to and used with the system of the SD.

4.5.11 SD Finance

All financial debts that arise in the framework of operating the SD are provided with a specific payment code for the purpose of classification.

4.5.11.1 Operating Costs Computer with Splitting Function:

All costs arising from the operation of the gourmet warehouse, leasing rates, financing, current costs, position location leasing, position location financing, maintenance costs, compensation for expenses of the GDM and the like are added up in this function and distributed onto the individual costs in accordance with a previously determined distribution key.

The debts arising as a result of the above as well as the account management are administered and realized by the GDM.

The GDM has the possibility in the case in which use is made of the function 4.5.11.5 SD Finance professional of transferring the arising debts to the latter automatically and to allow them to be realized by this function.

The connected actors are informed about the accounting and the account movements of this function in accordance with the setting of this function immediately after every account movement or at certain periodic intervals by the 4.4.1 SD DM distributor.

4.5.11.2 Cash Money:

The cash function at the payment terminal is carried out by the GDM or is automated by the function "4.5.11.5.1 Cash money pro".

If this function is not used, the GDM takes care of the inventory of cash flow as well as the received cash of the SD.

The system automatically transfers the finance distribution of the money to it and it brings about the distribution of the financial means according to this key.

4.5.11.3 Actor Debts:

The system prepares for the actor a list of all debts as well as the associated specific payment codes and the data relevant for the processing for the items delivered, which were also given to him by the SD.

4.5.11.3.1 Open Post List:

All debts of the actor which are defined by the system in the function 4.5.11.3 Actor debts are automatically inserted into his "open post list".

This open post list is managed by the actor or, however, when using the function 4.5.11.5 SD finance professional, by the latter and its affiliated functions.

4.5.11.4 SD Balance:

4.5.11 SD Balance communicates, as soon as asked by the actor, with 4.5.6 SD MHD Reminder and storage assistant in order to obtain a list of the existing item values of the actor in the warehouse and with all relevant functions of 4.5.12 SD Finance in order to obtain a list of the money flow, of the obligations and of the debts of the connected actor.

This list, which contains an inventory list at the same time, is made available to the actor for review.

Moreover, a data record with this information as content is generated in the previously defined format, e.g. DATEV, XML or CSV which can then be updated by the actor in his financial bookkeeping software.

4.5.11.5 SD Finance Professional:

4.5.11.5.1 Cash Money Pro:

This function takes care of the cash movements of the SD in a completely automated manner.

When using this function a contractual relationship is entered into with a cash service provider and with a general financial service provider. The cash service provider takes care of the change inventory of the SD according to previously agreed-on parameters, removes the received cash from the latter and pays it to a determined account of the financial service provider who then distributes it to the individual actors using the distribution key given to him by the system.

The data of the received payments relevant for the financial bookkeeping are automatically transmitted to the actor by the system and are updated into the function 4.5.11.4 SD Balance.

4.5.11.5.2 SD Debt Collection Procedure:

When using the function 4.5.11.5.2 SD Debt collection procedure the actor has the possibility of entering a business relationship with a financial service provider.

In this case all debts of the actor defined in point "4.5.11.3 Actor debts" and of the data relevant for their realization are transmitted to the financial service provider.

Depending on the contractual relationship between the actor and the financial service provider, the open debts of the connected SD actor are realized by this financial service provider according to one of the 4 possible forms of the activity of debt collection companies cited in the following.

1. Inclusion in the order (debt collection company acts in the name of and on for half of the purchaser)
2. Authorization of inclusion (as at 1. the debt collection company is authorized to request payment in its own name)
3. Debt collection cession (transfer of the debt—§ 398 BGB—for the purpose of inclusion)
4. Complete transfer (debt purchase—transfer to debt collection company without earmarking).

By using this function the function 4.5.11.3.1 Open post list of the actor is maintained "with its exact status".

Therefore, e.g. after collection of the debt in the Open post list it is registered as a conditionally received payment and after expiration of the retrieval period of the customer it is registered as a received payment and then credited to the actor, appropriately entered into the bookkeeping and the data transferred to the function 4.5.11.4 SD Balance and updated in it.

4.5.11.5.3 SD Debt Collection Pro:

"4.5.11.5.2 SD Debt collection pro" is a function of the professional management of debts.

The actor has the possibility here of entering into a business relationship with an attorney in an uncomplicated manner in order to rapidly and effectively realize overdue debts.

For the case that debts of the actor previously proved to be not realizable, the actor is make aware of them by the system. If the actor decides to have an attorney collect overdue debts, all data necessary for the realization will be automatically made available to the commissioned office.

The result of this procedure is automatically made available to 4.5.11.4 SD Balance for business evaluation.

4.6 Warning and Emergency Procedures:

4.6.1 Voltage Loss:

If the SD loses the voltage supply, the warehouse managers of the connected actors are immediately informed by Sms and/or email in accordance with the defined emergency algorithm plan.

At the same time hardware and software damage is prevented as well as possible by a "dasi" (data protection) initiated in case of a voltage loss and by an "SD start regulation after voltage loss".

Moreover, the SD will continue to supply the monitoring cameras with voltage from the emergency current reserve and will automatically send the images of the previously determined time period still in the memory as well as the images produced during the voltage loss.

4.6.2 Temperature Variations Outside of the Previously Defined Standard

If the digital temperature recording device as described in point 2.2.3 registers a relevant desired temperature range defined in advance, all DM's will be informed immediately by the SD DM so that they can react as rapidly as possible.

4.6.3 General Disturbances:

In the case of general disturbances of any type the previously defined DM's of the connected actors are informed by SMS and/or email so that the disturbance can be eliminated as rapidly as possible by their becoming active.

5. DANIEL'S GOURMET WAREHOUSE PREMIUM MARKETPLACE

In the optionally available function "Daniel's Gourmet Warehouse Premium Marketplace" the actor offers the customer a new online shopping experience by the software which makes the purchasing as real as possible as in a real marketplace or store by 3-D graphics.

The customer has the possibility as in a videogame to go through the marketplace and to enter the particular stores, which also optically recreate the original stores, or the market hall.

In the online shop itself the design of the stores and phase as well as the service by the personnel recreates reality.

6. DANIEL'S GOURMET WAREHOUSE PREMIUM MARKETPLACE DELUXE

In this function there is the possibility, in addition to the functions defined in point 6, of setting up a chat area. Therefore, customers can meet with other customers when shopping in the Gourmet Warehouse Marketplace and, e.g., talk about their purchases and exchange buying recommendations with each other.

The invention claimed is:

1. A method for handling automatic reception, storage, and dispensing of items and/or item consignments received in a packaging,
    packaging the items and/or item consignments in a packaging designed magnetic or ferromagnetic, at least in some sections, and the packaging designed magnetic or ferromagnetic, at least in some sections, is magnetically fixed on a side wall by means of an electromagnetic pushing and/or pulling means,
    moving the packaging laterally using the electromagnetic pushing and/or pulling means,
    wherein the moving of the packaging consists of pushing and/or pulling the packaging, laterally, from a shelf compartment completely onto a transport surface, and from the transport surface into the shelf compartment,
    wherein the transport surface is an electromagnetic transport surface and is magnetizable, at least in some areas, and
    wherein the packaging is configured to be magnetic or ferromagnetic, at least in some sections, at which the package makes contact with the electromagnetic device of the transport surface, and is magnetically fixed during transport on the magnetizable section of the transport surface.

2. The method according to claim 1, wherein the packaging designed magnetic or ferromagnetic, at least in some sections, is fixed by activating an electromagnetic device of the electromagnetic pushing and/or pulling means, and the packaging is fixed on the transport surface by activating the magnetizable section.

3. A device for handling of items received in a packaging, comprising:
    means for receiving items from at least one first actor,
    means for storing items, and
    means for automated dispensing of items to at least one second actor,
    wherein the means for storage of items comprises a handling system with a warehouse robot and a storage system in the form of a shelf system comprising a shelf compartment for the packaging, and wherein the warehouse robot has a receiving/discharging unit with a transport surface, from which, and onto which, the items are pushed/pulled laterally by means of pushing and/or pulling means, from the shelf compartment completely onto the transport surface, and from the transport surface into the shelf compartment,
    wherein an electromagnetic device in a form of an electromagnet is placed in or behind the pushing and/or pulling means,
    wherein at packaging sections, at which the package makes contact with the electromagnetic device, a magnetic or ferromagnetic material is incorporated, and
    wherein the packaging section of the packaging is magnetically fixed on a side wall by means of the pushing and/or pulling means,
    wherein an electromagnetic device in a form of an electromagnet is disposed in, or under, the transport surface,
    wherein packaging section, at which the package makes contact with the electromagnetic device of the transport surface, have a magnetic of ferromagnetic material incorporated therein, and
    wherein the packaging sections are magnetically fixable to the transport surface by means of the electromagnetic device during transport.

4. The device according to claim 3, wherein a camera is disposed in or on the pushing and/or pulling means, wherein the camera monitors the placing of the packaging with the items and/or item consignments on the pushing and/or pulling means.

5. The device according to claim 3, wherein the pushing or pulling means is pushable and/or pivotable above the transport surface by a linear drive, rack-and-pinion drive, or an articulated arm arrangement.

6. The device according to claim 3, wherein the linear drive, or rack-and-pinion drive, has longitudinal rails running parallel, or substantially parallel, to longitudinal edges of the transport surface, and a transverse rail movable along the longitudinal rails, wherein the pushing means is arranged on the transverse rail such that it can move longitudinally and rotatably.

7. The device according to claim 3, wherein the pushing and/or pulling means is arranged above the transport surface such that it is pushable and/or pivotable by means of the articulated arm arrangement.

8. The device according to claim 3, wherein the transport surface has limitations running in the longitudinal direction, and transversely to the direction of movement.

9. The device according to claim 3, wherein the transport surface is designed in a U-shape in cross-section.

10. The device according to claim 3, wherein the transport surface is arranged inclinable in the direction of the compartments of the shelves.

11. The device according to claim 3, wherein the pushing and/or pulling means is designed in a T-shape, or in the form of a block, comprising for the design in T-shape, a first shank connected to the articulated arm arrangement, or to the linear drive, or rack-and-pinion drive, and having a transversely running shank.

12. The device according to claim 3, wherein the pushing or pulling means is movable, pivotable and/or height-adjustable relative to the transport surface.

13. The device according to claim 2, wherein the at least one magnetic or ferromagnetic material is incorporated as an inlay in the packaging, which is made from a composite material.

14. The device according to claim 13, wherein the magnetic or ferromagnetic material is fixed to an inside or an outside of the packaging which is made from one or more non-magnetic materials or substances.

15. The device according to claim 13, wherein the magnetic or ferromagnetic material is designed fully, or partially, as a magnetic or ferromagnetic disposable or reusable chip, or as a magnetic or ferromagnetic means of payment.

16. The device according to claim 13, wherein the composite material is made of two or more materials, of which at least one material is magnetic or ferromagnetic.

17. The device according to claim 13, wherein the magnetic or ferromagnetic material is laminated into the composite material in the form of a metal foil.

* * * * *